United States Patent
Hozumi

Patent Number: 6,111,703
Date of Patent: Aug. 29, 2000

[54] IMAGE PICKUP OPTICAL SYSTEM

[75] Inventor: Kouki Hozumi, Hachioji, Japan

[73] Assignee: Olympus Optical Co., Ltd., Tokyo, Japan

[21] Appl. No.: 09/212,571

[22] Filed: Dec. 16, 1998

[30] Foreign Application Priority Data

Dec. 17, 1997 [JP] Japan ..................................... 9-363740

[51] Int. Cl.⁷ .................................................. G02B 9/34
[52] U.S. Cl. ........................ 359/772; 359/771; 359/773; 359/740
[58] Field of Search ..................................... 359/754, 771, 359/772, 763, 764, 757, 758, 738–740, 773

[56] References Cited

U.S. PATENT DOCUMENTS

| | | | |
|---|---|---|---|
| 4,456,345 | 6/1984 | Fujibayashi | 350/469 |
| 4,568,151 | 2/1986 | Mihara | 350/469 |
| 4,659,190 | 4/1987 | Mihara | 350/432 |
| 4,767,201 | 8/1988 | Fujita | 350/432 |

FOREIGN PATENT DOCUMENTS

| | | | |
|---|---|---|---|
| 59-177514 | 10/1984 | Japan | G02B 7/26 |
| 3-265809 | 11/1991 | Japan | G02B 13/18 |
| 09211320 | 8/1997 | Japan | G02B 13/04 |

Primary Examiner—Georgia Epps
Assistant Examiner—David N. Spector
Attorney, Agent, or Firm—Pillsbury Madison & Sutro LLP

[57] ABSTRACT

An image pickup optical system comprising, in order from the object side, a first lens component which comprises a meniscus lens element having a convex surface on the object side and a positive refractive power, a second lens component which comprises a negative lens element, a third lens component which comprises a negative meniscus lens element having a convex surface on the object side and a biconvex lens element, and a fourth lens component which comprises a negative meniscus lens element having a convex surface on the image side. This optical system is configured so as to have a large aperture, reserve a sufficient amount of marginal rays, and correct coma and curvature of field by disposing a stop on the object side of the third lens component and defining a refractive power of a cemented surface of the third lens component within a certain range.

19 Claims, 7 Drawing Sheets

IMAGE PICKUP OPTICAL SYSTEM

BACKGROUND OF THE INVENTION a) Field of the Invention

The present invention relates to a large aperture photographic lens system for compact lens shutter cameras.

b) Description of the Prior Art

A lens system disclosed by Japanese Patent Kokai Publication No. Hei 3-265809 is a conventional example of a lens system. The system is a telephoto consisting of four lens components of four lens elements. The lens system has a triplet and a negative meniscus lens element which is disposed on the image side and has a convex surface on the image side.

Further, lens systems disclosed by Japanese Patent Kokai Publication No. Sho 59-177514 and Japanese Patent Kokai Publication No. Hei 9-211320 are known as conventional examples of the lens system. Such a system consists of the four lens components of five lens elements, and uses a cemented lens component as a third lens component of the triplet. The lens system has four lens elements of five lens elements, or the Tessar type lens system and a negative meniscus lens element.

The lens system disclosed by Japanese Patent Kokai Publication No. Sho 59-177514 and Japanese Patent Kokai Publication No. Hei 3-265809 have field angles on the order of 63° at maximum and cannot be said as lens systems which have sufficiently wide field angles though these lens systems have sufficient high brightness or an aperture ratio of F/2.8.

Furthermore, the lens system disclosed by Japanese Patent Kokai Publication No. Hei 9-211320 has a simple composition consisting of the four lens components of five lens elements, a high aperture ratio of F/2.8 and a wide field angle on the order of 72°.

However, this conventional lens system is apt to produce distortion in the positive direction due to a fact that a stop is disposed between a third lens component and a fourth lens component, thereby making a power distribution remarkably asymmetrical with regard to the stop. In addition, this lens system allows curvature of field to be remarkably varied dependently on object distances and requires, for obtaining a favorable image located at a short distance, the so-called floating, or focusing by moving certain lens components for distances which are different from a moving distance of other lens components. Accordingly, this lens system must use a complicated lens moving mechanism. Further, the lens system can hardly obtain a sufficient amount of marginal rays due to a fact that the stop is disposed at a long distance from a first lens element, whereby offaxial rays transmit through the first lens element at heights far from an optical axis.

Furthermore, this conventional example is disadvantageous from the viewpoint of lens surface processing since it uses at least two aspherical surfaces on the fourth lens element and another lens element before the fourth lens element.

SUMMARY OF THE INVENTION

A primary object of the present invention is to provide an image pickup optical system which has a high aperture ratio on the order of F/2.8, a field angle on the order of 72°, a simple composition using a small number of aspherical surfaces, can correct aberrations favorably while reserving a sufficient amount of marginal rays and scarcely allows aberrations to be varied dependently on object distances.

The image pickup optical system according to the present invention is characterized in that it comprises, in order from the object side, a first lens component which comprises a positive meniscus lens element having a convex surface on the object side, a second lens component which comprises a negative lens element, a third lens component which comprises a cemented lens component consisting of a negative lens element and a positive lens element, and a fourth lens component which comprises a negative meniscus lens element having a convex surface on the image side: that it uses a stop which is disposed on the object side of the third lens component, and that it satisfies the following condition (1):

$$1.2 < R_3/\Delta N_3 \cdot f < 3.0 \tag{1}$$

DETAILED DESCRIPTION OF THE PREFERRED EMBODIMENTS

Figure 1:
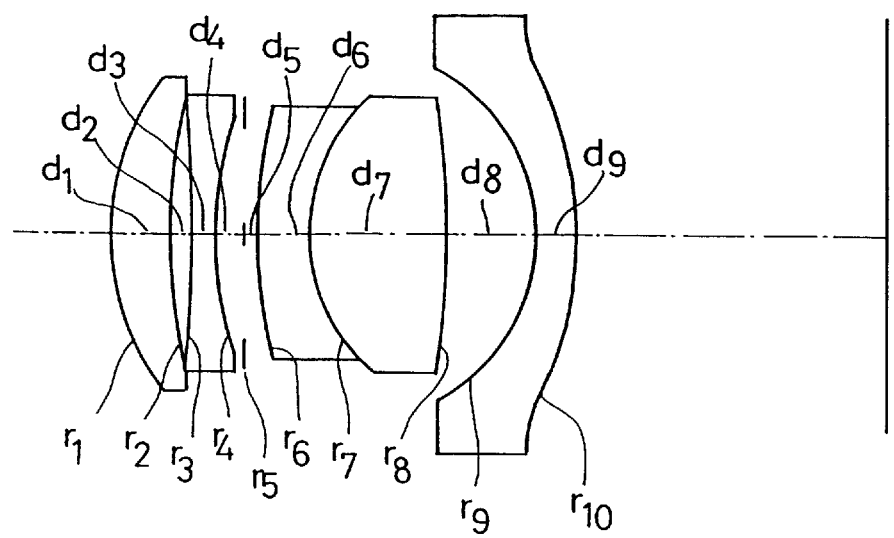
FIGS. 1 through 11 show sectional views illustrating compositions of first through eleventh embodiments respectively of the image pickup optical system according to the present invention.

The image pickup optical system according to the present invention which has a first composition is characterized in that it comprises, in order from the object side, a first lens component which comprises a positive meniscus lens having a convex surface on the object side and a positive refractive power, a second lens component which comprises a negative lens element, a third lens component which comprises a cemented lens component consisting of a negative lens element and a positive lens element, and a fourth lens component which comprises a negative meniscus lens element having a convex surface on the image side; that the cemented lens component of the third lens component comprises a negative meniscus lens element having a convex surface on the object side and a biconvex lens element; that the optical system comprises a stop disposed on the object side of the third lens component; and that it satisfies the following condition (1):

$$1.2 < R_3/\Delta N_3 \cdot f < 3.0 \tag{1}$$

wherein the reference symbol $R_3$ represents a radius of curvature on a cemented surface of the third lens component, the reference symbol $\Delta N_3$ designates a difference between a refractive index $N_p$ of the positive lens element of the third lens component for the d-line and a refractive index $N_n$ of the negative lens element for the d-line ($N_p - N_n$), and the reference symbol f denotes a focal length of the image pickup optical system as a whole.

For a lens system which has a large aperture and a large field angle, it is generally important to reserve a required amount of marginal rays since offaxial rays having large angles of incidence and a thick light bundle are incident on the lens system, whereby rays outside an effective diameter of the lens system are eclipsed. Further, the lens system produces a large amount of coma of high orders since it receives the offaxial rays having the large angles of incidence and the thick light bundle for reserving a required intensity of marginal rays.

The optical system according to the present invention is configured to be capable of reserving the required amount of marginal rays by disposing the stop before the third lens component so that offaxial rays can efficiently transmit through each of the lens components.

Further, the optical system according to the present invention is configured to provide the cemented surface of the third lens component with roles to control curvature of field and correct coma of high orders by selecting curvature on the cemented surface of the third lens component and a difference between a refractive index of the negative meniscus lens element and that of the biconvex lens element of the third lens component so as to satisfy the condition (1).

If the upper limit of 3.0 of the condition (1) is exceeded, the cemented surface of the third lens component cannot exhibit a sufficient effect to correct aberrations, whereby a meridional image surface will be remarkably overcorrected and outward coma will be produced. If the lower limit of 1.2 of the condition (1) is exceeded, in contrast, the aberration correcting function of the cemented surface will be too strong, thereby remarkably undercorrecting the image surface. Accordingly, it will be difficult to balance curvature of field with spherical aberration and remarkably aggravating coma of high orders.

Furthermore, a small value of $R_3$ is not preferable since it reduces a marginal thickness of the positive lens element of the third lens component, thereby making it difficult to process the lens element.

For the image pickup optical system which has the composition described above, it is desirable to configure each of the first, second and third lens components so as to have spherical surfaces.

The optical system having the first composition described above in which the stop is disposed before the third cemented lens component has a power distribution which is scarcely eccentric with regard to the stop. Therefore, this optical system is configured so as to facilitate to balance aberrations. Accordingly, the first, second and third lens components can have spherical surfaces only so that the optical system can be manufactured at a low cost or high productivity and form an image of a required quality. Further, use of at least one aspherical surface makes it possible to enhance offaxial performance for correction of curvature of field, etc. with a high efficiency (with a small number of aspherical surfaces).

It is desirable to configure the optical system so as to satisfy the condition (2) mentioned below while maintaining the basic arrangement of the first composition described above, that is, without changing the composition wherein the optical system comprises, in order from the object side, the first lens component which comprises the positive meniscus lens element having the convex surface on the object side, the second lens component which comprises the negative lens element, the third lens component which is the cemented lens component consisting of the negative lens element and the positive lens element, and the fourth lens component which comprises the negative meniscus lens element having the convex surface on the image side:

$$0.1 < \Delta N_3 < 0.25 \quad (2)$$

When the condition (2) mentioned above is satisfied, the cemented surface of the third lens component is more advantageous for correction of aberrations and manufacturing of the lens elements.

If the lower limit of 0.1 of the condition (2) is exceeded, a Petzval's sum will be enlarged, thereby undesirably lowering the effect to correct curvature of field. If the lower limit of the condition (2) is exceeded, the radius of curvature $R_3$ of the cemented surface must be shortened to satisfy the condition (1), whereby the marginal thickness of the positive lens element of the third lens component will be insufficient and workability of the lens element will be lowered.

If the upper limit of 0.25 of the condition (2) is exceeded, the cemented surface of the third lens component will have too long a radius of curvature, thereby producing aberrations in smaller amounts and exhibiting a lowered aberration correcting effect. Further, glass materials which favorably corrects chromatic aberration can hardly be obtained since two glass materials which have refractive indices largely different from each other are selectable only within a certain limit due to their original properties.

The image pickup optical system according to the present invention which has a second composition is characterized in that it comprises a first lens component comprising a meniscus lens element which has a convex surface on the object side and a positive refractive power, a second lens component which comprises a negative lens element, a third lens component which comprises a cemented lens component consisting of a negative lens element and a positive lens element, and a fourth lens component which comprises a negative meniscus lens element; and that it satisfies the following condition (3):

$$-2.0 < f_4/f < -1.2 \quad (3)$$

wherein the reference symbol f represents a focal length of the optical system as a whole and the reference symbol $f_4$ designates a focal length of the fourth lens component.

Speaking of a general property of a lens system which is of the so-called telephoto type, a negative meniscus lens element disposed on the image side which corresponds to the fourth lens component of the optical system according to the present invention has not only a function to correct curvature of field but also a function to displace a rear principal point forward, thereby shortening a total length of the lens system.

The present invention selects a power of the fourth lens component as defined by the condition (3) to shorten a total length of the optical system, correct distortion and reduce variations of aberrations for photographing objects located at extremely short distances.

When a power of the fourth lens component is strengthened until the upper limit of -1.2 of the condition (3) is exceeded, it is necessary to strengthen a total power of the first through third lens components along with the strengthening of the power of the fourth lens component or dispose the fourth lens component at a location apart from the third lens component and close to an image surface. When the total power of the first through third lens components is strengthened, each of these lens components produces aberrations in larger amounts, thereby making it difficult to correct these aberrations. When the fourth lens component is disposed at a location apart from the third lens component, a power distribution in the optical system is remarkably asymmetrical, thereby aggravating distortion and allowing aberrations to be varied more remarkably by changes of an object distance. Furthermore, the fourth lens component will undesirably have a large effective diameter. When a power of the fourth lens component is weakened until the lower limit of -2.0 of the condition (3) is exceeded, in contrast, the fourth lens unit exhibits a lowered role as a field flattener, thereby making it difficult to maintain flatness of the image surface and prolonging the total length of the optical system.

The image pickup optical system according to the present invention which has a third composition is characterized in that it comprises, in order from the object side, a first lens component which comprises a positive meniscus lens element having a convex surface on the object side, a second lens component which comprises a negative lens element, a third lens component which comprises a cemented lens component consisting of a negative lens element and a positive lens element, and a fourth lens component which comprises a negative meniscus lens element having a convex surface on the image side; that it uses a stop which is disposed on the object side of the third lens component; and that it satisfies the following condition (4):

$$-0.5 < f/f_{12} < 0.1 \tag{4}$$

wherein the reference symbol $f_{12}$ represents a total focal length of the first lens component and the second lens component.

If the lower limit of −0.5 of the condition (4) is exceeded, a front lens unit which is composed of the lens elements disposed before the stop will have a strong negative power, thereby making it difficult to correct longitudinal chromatic aberration produced by the front lens unit with a rear lens unit which is composed of the lens elements disposed after the stop while balancing the longitudinal chromatic aberration with lateral chromatic aberration. Further, it is necessary to strengthen a positive power of the rear lens unit, thereby producing aberrations in larger amounts. If the total lens system which is composed of the second lens component and the third lens component has a positive power exceeding the upper limit of 0.1 of the condition (4), in contrast, a power before the stop will be unbalanced with a power after the stop, thereby producing remarkably distortion in the positive direction. Further, lateral chromatic aberration will be produced remarkably and can hardly be corrected.

For the optical system according to the present invention which has the third composition described above, it is desirable to satisfy the following condition (5):

$$n_1 > n_2 \tag{5}$$

wherein the reference symbols $n_1$ and $n_2$ represent refractive indices of the first lens component and the second lens component respectively for the d-line.

If the condition (5) is not satisfied, the second lens component will have an insufficient function to correct spherical aberration, thereby making it hard to balance spherical aberration with the other aberrations.

Furthermore, it is desirable to configure the optical system according to the present invention which has the third composition so as to satisfy the following condition (6):

$$1.3 < f/r_2 - f/r_3 < 3.0 \tag{6}$$

wherein the reference symbol $r_2$ represents a radius of curvature on an image side surface of the first lens component and the reference symbol $r_3$ designates a radius of curvature on an object side surface of the second lens component.

If the upper limit of 3.0 of the condition (6) is exceeded, an effective diameter of an air lens formed between the first lens component and the second lens component will be shortened, thereby making it difficult to reserve a required amount of marginal rays and lowering light intensities at marginal portions. In order to avoid the lowering of light intensities, an airspace between the first lens component and the second lens component must be widened, thereby producing spherical aberration of high orders will be produced in a larger amount. If the lower limit of 1.3 of the condition (6) is exceeded, in contrast, coma and distortion will be aggravated.

The image pickup optical system according to the present invention which has a fourth composition comprises, in order from the object side, a first lens component which comprises a positive meniscus lens element having a convex surface on the object side, a second lens component which comprises a negative lens element, a third lens component which comprises a cemented lens component consisting of a negative lens element and a positive lens element, and a fourth lens component which comprises a negative meniscus lens element having a convex surface on the image side, and satisfies the following condition (7):

$$0.2 < D_3/f < 0.3 \tag{7}$$

wherein the reference symbol $D_3$ represents a length as measured from an object side surface of the third lens component to an image side surface thereof.

If the upper limit of 0.3 of the condition (7) is exceeded, an offaxial light bundle will be incident on the third lens component or rays emerging from the third lens component will be high, thereby making it impossible to reserve marginal rays in a sufficient amount. If the lower limit of the 0.2 of the condition (7) is exceeded, the third lens component will have a weakened function to correct astigmatism produced by a surface of incidence of the second lens component, thereby making it impossible to sufficiently correct astigmatic difference at an intermediate image height.

The image pickup optical system according to the present invention which has a fifth composition comprises, in order from the object side, a first lens component which comprises a positive meniscus lens element having a convex surface on the object side, a second lens component which comprises a negative lens element, a third lens component which comprises a cemented lens component consisting of a negative lens element and a positive lens element, and a fourth lens component which comprises a negative meniscus lens element having a convex surface on the image side; uses a stop disposed on the object side of the third lens component; and satisfies the following condition (8):

$$0.4 < \Sigma D_{s-4}/f < 0.5 \tag{8}$$

wherein the reference symbol $\Sigma D_{s-4}$ represents a distance as measured from the stop to a vertex of an object side surface of the fourth lens component.

If the upper limit of 0.5 of the condition (8) is exceeded, a distance as measured from the stop to the fourth lens component is prolonged, thereby making a power distribution more asymmetrical with regard to the stop and aggravating positive distortion. Further, a height of a principal ray incident on the fourth lens component is largely variable dependently on object distances, thereby making an image surface correcting function of the fourth lens component largely different. Accordingly, an image surface will be remarkably tilted toward an underside when the optical system is focused on an object located at an extremely short distance. If the lower limit of 0.4 of the condition (8) is exceeded, in contrast, an offaxial light bundle will be incident low on the fourth lens component, thereby weakening a function of the fourth lens component to correct curvature of field and making it difficult to maintain flatness of the image surface. Furthermore, an effect to displace a rear principal point forward will be lowered, thereby undesirably prolonging a total length of the optical system.

The image pickup optical system according to the present invention which has a sixth composition is characterized in that it comprises, in order from the object side, a first lens component which comprises a positive meniscus lens element having a convex surface on the object side, a second lens component which comprises a negative lens element, a third lens component which comprises a cemented lens component consisting of a negative lens element and a positive lens element, and a fourth lens component which comprises a negative meniscus lens element having a convex surface on the image side; and that the third lens component has a biconvex shape as a whole and consists, in order from the object side, of a negative meniscus lens element and a positive lens element.

Since the optical system mentioned as the object of the present invention has a small F number and receives a thick light bundle, it produces spherical aberration of high orders in a large amount. Therefore, the optical system is configured to suppress production of spherical aberration itself by sharing a positive refractive power among a surface on incidence of the first lens component, and a surface of incidence, a cemented surface and a surface of emergence of the third lens component.

It is desirable that the optical system which has the sixth composition described above satisfies the following condition (9):

$$-0.5 < \phi_{3n}/\phi_{3p} < -0.25 \quad (9)$$

wherein the reference symbol $\phi_{3n}$ represents a power of the negative lens element of the third cemented lens component and the reference symbol $\phi_{3p}$ designates a power of the positive lens element of the third cemented lens component.

If the upper limit of −0.25 of the condition (9) is exceeded, the surface of incidence of the third cemented lens component will have a high curvature and incident rays will have large angles of incidence, thereby aggravating coma. Further, a Petzval's sum will be enlarged, thereby undesirably aggravating curvature of field. If the lower limit of −0.5 of the condition (9) is exceeded, the surface of incidence of the third cemented lens component will have a weakened converging function, whereby other surfaces must bear a heavier burden of positive refractive power and aggravate spherical aberration.

In addition, it is more desirable to satisfy, in place of the condition (9), the following condition (9'):

$$-0.45 < \phi_{3n}/\phi_{3p} < -0.25 \quad (9')$$

For the image pickup optical system which has any one of the first through sixth compositions, it is desirable that the fourth lens component has at least one aspherical surface having a diverging power which is weakened toward a marginal portion thereof.

In the lens system according to the present invention, the fourth lens component is disposed at a long distance from the stop, whereby a light bundle emerging from the stop is converged thin, and light bundles coming from an object point on an optical axis and object points apart from the optical axis are separated from one another and clearly resolved on the fourth lens component. It is therefore possible to correct curvature of field favorably by configuring at least one surface of the fourth lens component as an aspherical surface having a diverging power toward a marginal portion thereof.

It is desirable in this case to make the fourth lens component of a resin material.

When an aspherical surface is to be formed on the fourth lens component, it is easy to work an aspherical surface by selecting an optical resin material for the lens component and forming it by injection molding. In such a case, it is possible to reduce influences due to deformation of the resin caused by environmental variations by imparting a power which does not exceed the lower limit of the condition (3).

In the optical system which has the second, fourth or sixth composition, it is desirable to dispose a stop on the object side of the third lens component.

A light bundle incident on the first lens component and a light bundle incident on the fourth lens component can be set at adequate heights by disposing a stop on a front surface of the third lens component. Accordingly, a light bundle travels at an adequate height through an airspace between the first lens component and the second lens component, thereby making it possible to favorably correct coma of high orders and prevent the light bundle from being eclipsed by an edge of the airspace to reserve a required intensity of marginal rays. Further, the fourth lens component is apart at an adequate distance from the stop and a light bundle having a large image height passes through a marginal portion of the fourth lens component, thereby providing an advantage for correction of an image surface.

Description will be made of power balance, or powers distributed on both sides of a stop. When a stop is disposed on the image side of the third lens component, a positive refractive power is distributed on the object side of a stop and a negative refractive power is distributed on the image side of a stop. Accordingly, the powers are remarkably eccentric or unbalanced, thereby allowing positive distortion to be produced easily.

When a stop is disposed on the object side of the third lens component, in contrast, the first positive lens component and the second negative lens component are disposed on the object side of the stop, thereby weakening a total refractive power by cancellation. Though the third lens component has a strong positive power on the image side of the stop, on the other hand, the third lens component produces a small influence since it is close to the stop. Contribution of the third lens component to a power of the optical system as whole is further reduced by the fourth lens component which is disposed apart from the stop and has a function to cancel the influence produced by the third lens component.

For the reason described above, the stop is disposed on the object side of the third lens component in the lens system according to the present invention. Accordingly, the lens system has a power distribution which is balanced well with regard to the stop, thereby being capable of suppressing production of distortion.

Embodiment 1

$f = 100$ mm, F/2.8
$r_1 = 37.166$
  $d_1 = 9.30$   $n_1 = 1.73400$   $v_1 = 51.47$
$r_2 = 90.483$
  $d_2 = 3.09$
$r_3 = -285.022$
  $d_3 = 3.02$   $n_2 = 1.64769$   $v_2 = 33.79$
$r_4 = 44.949$
  $d_4 = 5.04$
$r_5 =$ Stop
  $d_5 = 1.73$
$r_6 = 72.512$
  $d_6 = 8.15$   $n_3 = 1.57501$   $v_3 = 41.50$
$r_7 = 27.670$
  $d_7 = 20.96$   $n_4 = 1.74100$   $v_4 = 52.64$
$r_8 = -135.542$
  $d_8 = 13.65$
$r_9 = -27.688$
  $d_9 = 6.26$   $n_5 = 1.52542$   $v_5 = 55.78$
$r_{10} = -45.269$   (aspherical surface)

-continued aspherical surface coefficients $K = -0.082$, $A_4 = 1.80099 \times 10^{-6}$, $A_6 = 1.27491 \times 10^{-9}$
$A_8 = 5.51425 \times 10^{-13}$, $A_{10} = 1.08826 \times 10^{-15}$
$R_3/\Delta N_3 \cdot f = 1.67$, $\Delta N_3 = 0.17$, $f_4 = -155.00$,
$f/f_{12} = -0.149$, $f/r_2 - f/r_3 = 1.46$, $f_{12} = -671.00$,
$D_3 = 29.11$, $\Sigma D_{8-4} = 44.49$,
$\phi_{3n} = -0.0120$, $\phi_{3p} = 0.0305$, $\phi_{3n}/\phi_{3p} = -0.39$ Embodiment 2

$f = 100$ mm, F/2.8
$r_1 = 37.076$
　　$d_1 = 8.28$　　$n_1 = 1.78800$　　$\nu_1 = 47.37$
$r_2 = 72.780$
　　$d_2 = 4.25$
$r_3 = -278.982$
　　$d_3 = 3.11$　　$n_2 = 1.64769$　　$\nu_2 = 33.79$
$r_4 = 42.610$
　　$d_4 = 7.26$
$r_5 = $ Stop
　　$d_5 = 2.22$
$r_6 = 54.338$
　　$d_6 = 7.43$　　$n_3 = 1.62004$　　$\nu_3 = 36.26$
$r_7 = 31.758$
　　$d_7 = 22.10$　　$n_4 = 1.75500$　　$\nu_4 = 52.32$
$r_8 = -133.900$
　　$d_8 = 12.20$
$r_9 = -34.746$
　　$d_9 = 3.46$　　$n_5 = 1.52542$　　$\nu_5 = 55.78$
$r_{10} = -71.079$　(aspherical surface)

aspherical surface coefficients $K = -0.272$, $A_4 = 2.85993 \times 10^{-6}$, $A_6 = 1.16260 \times 10^{-9}$
$A_8 = 3.42202 \times 10^{-12}$, $A_{10} = -5.70453 \times 10^{-15}$
$A_{12} = 4.10644 \times 10^{-18}$
$R_3/\Delta N_3 \cdot f = 2.35$, $\Delta N_3 = 0.14$, $f_4 = -134.00$,
$f/f_{12} = -0.317$, $f/r_2 - f/r_3 = 1.73$, $f_{12} = -315.00$,
$D_3 = 29.53$, $\Sigma D_{8-4} = 43.95$,
$\phi_{3n} = -0.0071$, $\phi_{3p} = 0.0277$, $\phi_{3n}/\phi_{3p} = -0.26$ Embodiment 3

$f = 100$ mm, F/2.8
$r_1 = 36.321$
　　$d_1 = 8.02$　　$n_1 = 1.72916$　　$\nu_1 = 54.68$
$r_2 = 103.735$
　　$d_2 = 3.14$
$r_3 = -272.777$
　　$d_3 = 2.44$　　$n_2 = 1.63980$　　$\nu_2 = 34.46$
$r_4 = 45.552$
　　$d_4 = 5.31$
$r_5 = $ Stop
　　$d_5 = 1.74$
$r_6 = 81.977$
　　$d_6 = 8.32$　　$n_3 = 1.63980$　　$\nu_3 = 34.46$
$r_7 = 25.883$
　　$d_7 = 14.84$　　$n_4 = 1.74400$　　$\nu_4 = 44.78$
$r_8 = -131.863$
　　$d_8 = 16.68$
$r_9 = -26.218$
　　$d_9 = 9.78$　　$n_5 = 1.52542$　　$\nu_5 = 55.78$
$r_{10} = -40.236$　(aspherical surface)

aspherical surface coefficients $K = -0.247$, $A_4 = 1.26835 \times 10^{-6}$, $A_6 = 9.56029 \times 10^{-10}$
$A_8 = -1.86652 \times 10^{-13}$, $A_{10} = 1.21147 \times 10^{-15}$
$R_3/\Delta N_3 \cdot f = 2.48$, $\Delta N_3 = 0.10$, $f_4 = -189.00$,
$f/f_{12} = -0.022$, $f/r_2 - f/r_3 = 1.33$, $f_{12} = -4545.00$,
$D_3 = 23.16$, $\Sigma D_4 = 41.58$,
$\phi_{3n} = -0.0159$, $\phi_{3p} = 0.0330$, $\phi_{3n}/\phi_{3p} = -0.48$ -continued Embodiment 4

$f = 100$ mm, F/2.8
$r_1 = 37.944$
　　$d_1 = 5.55$　　$n_1 = 1.74100$　　$\nu_1 = 52.64$
$r_2 = 71.142$
　　$d_2 = 3.46$
$r_3 = -166.874$
　　$d_3 = 4.57$　　$n_2 = 1.68893$　　$\nu_2 = 31.07$
$r_4 = 67.222$
　　$d_4 = 5.99$
$r_5 = $ Stop
　　$d_5 = 1.78$
$r_6 = 69.755$
　　$d_6 = 6.12$　　$n_3 = 1.59270$　　$\nu_3 = 35.31$
$r_7 = 28.871$
　　$d_7 = 19.72$　　$n_4 = 1.81600$　　$\nu_4 = 46.62$
$r_8 = -209.557$　(aspherical surface)
　　$d_8 = 16.44$
$r_9 = -24.960$
　　$d_9 = 3.86$　　$n_5 = 1.63980$　　$\nu_5 = 34.46$
$r_{10} = -37.537$　(aspherical surface)

aspherical surface coefficients (8th surface)　$K = 0.303$
(10th surface)　$K = 0.249$, $A_4 = 2.22720 \times 10^{-6}$,
　　$A_6 = 4.27231 \times 10^{-9}$, $A_8 = -2.15385 \times 10^{-12}$
　　$A_{10} = 6.44233 \times 10^{-15}$
$R_3/\Delta N_3 \cdot f = 1.29$, $\Delta N_3 = 0.22$, $f_4 = -132.00$,
$f/f_{12} = -0.307$, $f/r_2 - f/r_3 = 2.00$, $f_{12} = -326.00$,
$D_3 = 25.84$, $\Sigma D_{8-4} = 44.06$,
$\phi_{3n} = -0.0114$, $\phi_{3p} = 0.0323$, $\phi_{3n}/\phi_{3p} = -0.35$ Embodiment 5

$f = 100$ mm, F/2.8
$r_1 = 36.190$
　　$d_1 = 8.32$　　$n_1 = 1.78800$　　$\nu_1 = 47.37$
$r_2 = 47.859$
　　$d_2 = 6.07$
$r_3 = -119.337$
　　$d_3 = 3.09$　　$n_2 = 1.69895$　　$\nu_2 = 30.13$
$r_4 = 128.568$
　　$d_4 = 3.66$
$r_5 = $ Stop
　　$d_5 = 2.43$
$r_6 = 67.971$
　　$d_6 = 4.17$　　$n_3 = 1.62588$　　$\nu_3 = 35.70$
$r_7 = 27.105$
　　$d_7 = 19.92$　　$n_4 = 1.81600$　　$\nu_4 = 46.62$
$r_8 = -244.292$　(aspherical surface)
　　$d_8 = 15.38$
$r_9 = -24.671$
　　$d_9 = 4.59$　　$n_5 = 1.52542$　　$\nu_5 = 55.78$
$r_{10} = -36.848$　(aspherical surface)

aspherical surface coefficients (8th surface)　$K = -0.694$, $A_4 = 1.29742 \times 10^{-6}$,
　　$A_6 = -3.53510 \times 10^{-10}$, $A_8 = 2.54276 \times 10^{-12}$
　　$A_{10} = -1.09681 \times 10^{-14}$
(10th surface)　$K = -0.027$, $A_4 = 1.62110 \times 10^{-6}$,
　　$A_6 = 2.29451 \times 10^{-9}$, $A_8 = -6.79066 \times 10^{-13}$
　　$A_{10} = 6.04537 \times 10^{-15}$
$R_3/\Delta N_3 \cdot f = 1.43$, $\Delta N_3 = 0.19$, $f_4 = -163.00$,
$f/f_{12} = -0.267$, $f/r_2 - f/r_3 = 2.92$, $f_{12} = -375.00$,
$D_3 = 24.09$, $\Sigma D_{8-4} = 41.90$,
$\phi_{3n} = -0.0133$, $\phi_{3p} = 0.0313$, $\phi_{3n}/\phi_{3p} = -0.42$ Embodiment 6

$f = 100$ mm, F/2.8
$r_1 = 44.173$
　　$d_1 = 9.46$　　$n_1 = 1.77250$　　$\nu_1 = 49.60$
$r_2 = 119.577$
　　$d_2 = 3.64$
$r_3 = -140.099$
　　$d_3 = 3.45$　　$n_2 = 1.64769$　　$\nu_2 = 33.79$

-continued $r_4 = 56.040$
    $d_4 = 4.81$
$r_5 =$ Stop
    $d_5 = 2.45$
$r_6 = 99.397$
    $d_6 = 3.25$      $n_3 = 1.57501$      $\nu_3 = 41.50$
$r_7 = 28.843$
    $d_7 = 18.56$      $n_4 = 1.75500$      $\nu_4 = 52.32$
$r_8 = -107.533$
    $d_8 = 16.55$
$r_9 = -36.314$   (aspherical surface)
    $d_9 = 4.14$      $n_5 = 1.52542$      $\nu_5 = 55.78$
$r_{10} = -64.810$ aspherical surface coefficients $K = 0.071$,     $A_4 = -3.50025 \times 10^{-6}$,     $A_6 = -5.57485 \times 10^{-9}$
                  $A_8 = 1.16499 \times 10^{-11}$,    $A_{10} = -3.86424 \times 10^{-14}$
    $R_3/\Delta N_3 \cdot f = 1.60$, $\Delta N_3 = 0.18$, $f_4 = -165.00$,
    $f/f_{12} = -0.217$, $f/r_2 - f/r_3 = 1.55$, $f_{12} = -461.00$,
    $D_3 = 21.81$, $\Sigma D_{s-4} = 40.81$,
    $\phi_{3n} = -0.0139$, $\phi_{3p} = 0.0321$, $\phi_{3n}/\phi_{3p} = -0.43$ Embodiment 7

$f = 100$ mm, F/2.8
$r_1 = 38.649$
    $d_1 = 7.69$      $n_1 = 1.77250$      $\nu_1 = 49.60$
$r_2 = 72.769$
    $d_2 = 4.04$
$r_3 = -273.191$
    $d_3 = 3.46$      $n_2 = 1.64769$      $\nu_2 = 33.79$
$r_4 = 51.791$
    $d_4 = 5.35$
$r_5 =$ Stop
    $d_5 = 2.61$
$r_6 = 67.419$
    $d_6 = 4.82$      $n_3 = 1.57501$      $\nu_3 = 41.50$
$r_7 = 24.666$
    $d_7 = 21.27$      $n_4 = 1.74100$      $\nu_4 = 52.64$
$r_8 = -225.559$
    $d_8 = 14.48$
$r_9 = -25.224$   (aspherical surface)
    $d_9 = 3.57$      $n_5 = 1.52542$      $\nu_5 = 55.78$
$r_{10} = -34.874$   (aspherical surface)
aspherical surface coefficients (9th surface)    $K = 0.062$, $A_4 = -6.59100 \times 10^{-6}$,
                 $A_6 = 1.10455 \times 10^{-8}$, $A_8 = -1.72908 \times 10^{-12}$
                 $A_{10} = 7.11982 \times 10^{-15}$
(10th surface)   $K = -0.098$, $A_4 = -3.14929 \times 10^{-6}$,
                 $A_6 = 1.21401 \times 10^{-8}$, $A_8 = -3.09824 \times 10^{-12}$
                 $A_{10} = 6.64411 \times 10^{-15}$
    $R_3/\Delta N_3 \cdot f = 1.49$, $\Delta N_3 = 0.17$, $f_4 = -199.00$,
    $f/f_{12} = -0.246$, $f/r_2 - f/r_3 = 1.74$, $f_{12} = -407.00$,
    $D_3 = 26.09$, $\Sigma D_{s-4} = 43.18$,
    $\phi_{3n} = -0.0142$, $\phi_{3p} = 0.0325$, $\phi_{3n}/\phi_{3p} = -0.44$ Embodiment 8

$f = 100$ mm, F/2.8
$r_1 = 38.146$
    $d_1 = 8.00$      $n_1 = 1.72916$      $\nu_1 = 54.70$
$r_2 = 64.509$
    $d_2 = 4.54$
$r_3 = -178.545$   (aspherical surface)
    $d_3 = 3.13$      $n_2 = 1.63980$      $\nu_2 = 34.46$
$r_4 = 66.155$
    $d_4 = 3.90$
$r_5 =$ Stop
    $d_5 = 2.45$
$r_6 = 70.521$
    $d_6 = 6.71$      $n_3 = 1.60562$      $\nu_3 = 43.70$
$r_7 = 26.820$
    $d_7 = 17.00$      $n_4 = 1.74100$      $\nu_4 = 52.64$
$r_8 = -108.095$
    $d_8 = 17.98$ -continued $r_9 = -26.143$
    $d_9 = 5.98$      $n_5 = 1.52542$      $\nu_5 = 55.78$
$r_{10} = -45.155$   (aspherical surface)
aspherical surface coefficients (3rd surface)     $K = 0.212$, $A_4 = -6.94341 \times 10^{-7}$,
                $A_6 = 3.69326 \times 10^{-10}$, $A_8 = -4.49219 \times 10^{-12}$
                $A_{10} = 6.73436 \times 10^{-15}$
(10th surface)   $K = -0.093$, $A_4 = 1.83486 \times 10^{-6}$,
                $A_6 = 1.40753 \times 10^{-9}$, $A_8 = -4.92950 \times 10^{-13}$
                $A_{10} = 1.53272 \times 10^{-15}$
    $R_3/\Delta N_3 \cdot f = 1.99$, $\Delta N_3 = 0.14$, $f_4 = -133.00$,
    $f/f_{12} = -0.264$, $f/r_2 - f/r_3 = 2.11$, $f_{12} = -379.00$,
    $D_3 = 23.71$, $\Sigma D_{s-4} = 44.14$,
    $\phi_{3n} = -0.0132$, $\phi_{3p} = 0.0285$, $\phi_{3n}/\phi_{3p} = -0.46$ Embodiment 9

$f = 100$ mm, F/2.8
$r_1 = 33.856$
    $d_1 = 8.38$      $n_1 = 1.72916$      $\nu_1 = 54.68$
$r_2 = 73.806$
    $d_2 = 3.81$
$r_3 = -259.811$
    $d_3 = 2.79$      $n_2 = 1.63980$      $\nu_2 = 34.46$
$r_4 = 40.204$
    $d_4 = 5.90$
$r_5 =$ Stop
    $d_5 = 1.43$
$r_6 = 52.999$
    $d_6 = 7.20$      $n_3 = 1.63980$      $\nu_3 = 34.46$
$r_7 = 31.413$
    $d_7 = 21.36$      $n_4 = 1.74320$      $\nu_4 = 49.34$
$r_8 = -109.215$
    $d_8 = 11.01$
$r_9 = -31.605$
    $d_9 = 4.34$      $n_5 = 1.52542$      $\nu = 55.78$
$r_{10} = -72.042$   (aspherical surface)
aspherical surface coefficients $K = -0.234$,    $A_4 = 2.55244 \times 10^{-6}$,    $A_6 = 1.45060 \times 10^{-9}$
                    $A_8 = -2.20318 \times 10^{-13}$,    $A_{10} = 6.03546 \times 10^{-16}$
    $R_3/\Delta N_3 \cdot f = 3.03$, $\Delta N_3 = 0.10$, $f_4 = -111.00$,
    $f/f_{12} = -0.259$, $f/r_2 - f/r_3 = 1.74$, $f_{12} = -386.00$,
    $D_3 = 28.56$, $\Sigma D_{s-4} = 41.00$,
    $\phi_{3n} = -0.0072$, $\phi_{3p} = 0.0264$, $\phi_{3n}/\phi_{3p} = -0.27$ Embodiment 10

$f = 100$ mm, F/2.8
$r_1 = 38.633$
    $d_1 = 8.05$      $n_1 = 1.78800$      $\nu_1 = 47.37$
$r_2 = 63.557$
    $d_2 = 6.30$
$r_3 = -147.618$
    $d_3 = 3.12$      $n_2 = 1.69895$      $\nu_2 = 30.13$
$r_4 = 72.567$
    $d_4 = 4.03$
$r_5 =$ Stop
    $d_5 = 5.58$
$r_6 = 46.530$
    $d_6 = 3.50$      $n_3 = 1.66680$      $\nu_3 = 33.05$
$r_7 = 31.504$
    $d_7 = 18.20$      $n_4 = 1.73400$      $\nu_4 = 51.47$
$r_8 = -178.897$   (aspherical surface)
    $d_8 = 17.93$
$r_9 = -25.459$
    $d_9 = 3.50$      $n_5 = 1.52542$      $\nu_5 = 55.78$
$r_{10} = -44.257$   (aspherical surface)

aspherical surface coefficients (8th surface)     $K = -1.015$, $A_4 = 1.12313 \times 10^{-6}$,
                $A_6 = -1.47737 \times 10^{-9}$, $A_8 = 3.38320 \times 10^{-12}$
                $A_{10} = -1.36332 \times 10^{-14}$
(10th surface)   $K = -0.312$, $A_4 = 1.08054 \times 10^{-6}$,
                $A_6 = 2.28588 \times 10^{-9}$, $A_8 = -4.77719 \times 10^{-13}$
                $A_{10} = 3.83726 \times 10^{-15}$ -continued $R_3/\Delta N_3 \cdot f = 4.69, \Delta N_3 = 0.07, f_4 = -122.00,$
$f/f_{12} = -0.294, f/r_2-f/r_3 = 2.25, f_{12} = -340.00,$
$D_3 = 21.70, \Sigma D_{s-4} = 45.21,$
$\phi_{3n} = -0.0062, \phi_{3p} = 0.0283, \phi_{3n}/\phi_{3p} = -0.22$ Embodiment 11

$f = 100$ mm, F/2.8
$r_1 = 38.715$
  $d_1 = 8.07$    $n_1 = 1.72916$    $v_1 = 54.68$
$r_2 = 77.173$
  $d_2 = 6.31$
$r_3 = -147.929$
  $d_3 = 3.13$    $n_2 = 1.76182$    $v_2 = 26.52$
$r_4 = 140.314$
  $d_4 = 4.04$
$r_5 =$ Stop
  $d_5 = 3.88$
$r_6 = 86.204$
  $d_6 = 7.02$    $n_3 = 1.62588$    $v_3 = 35.70$
$r_7 = 32.623$
  $d_7 = 19.31$    $n_4 = 1.78590$    $v_4 = 44.20$
$r_8 = -136.837$ (aspherical surface)
  $d_8 = 13.80$
$r_9 = -25.648$
  $d_9 = 3.51$    $n_5 = 1.52542$    $v_5 = 55.78$
$r_{10} = -53.350$ (aspherical surface)
aspherical surface coefficients (8th surface)    $K = -2.589, A_4 = -2.67104 \times 10^{-7},$
  $A_6 = -1.20449 \times 10^{-9}, A_8 = 2.95698 \times 10^{-12}$
  $A_{10} = -1.09006 \times 10^{-14}$
(10th surface)   $K = 1.583, A_4 = 3.16274 \times 10^{-6},$
  $A_6 = 1.74665 \times 10^{-9}, A_8 = -6.97917 \times 10^{-13}$
  $A_{10} = 2.83112 \times 10^{-15}$
  $R_3/\Delta N_3 \cdot f = 2.04, \Delta N_3 = 0.16, f_4 = -98.00,$
  $f/f_{12} = 0.131, f/r_2-f/r_3 = 1.97, f_{12} = 763.00,$
  $D_3 = 26.33, \Sigma D_{s-4} = 44.01,$
  $\phi_{3n} = -0.0133, \phi_{3p} = 0.0305, \phi_{3n}/\phi_{3p} = -0.44$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denotes refractive indices of the respective lens elements, and the reference symbols $v_1, v_2, \ldots$ represent Abbe's numbers of the respective lens elements.

The embodiments described above have compositions illustrated in FIGS. 1 through 11 respectively, wherein each of the optical systems comprises a first lens component which comprises a positive meniscus lens element having a convex surface on the object side, a second lens component which comprises a biconcave lens element, an aperture stop, a third lens component which comprises a cemented doublet consisting of a negative meniscus lens element having a convex surface on the object side and a biconvex lens element, and a fourth lens component which comprises a negative meniscus lens element having a convex surface on the image side.

Figure 2:
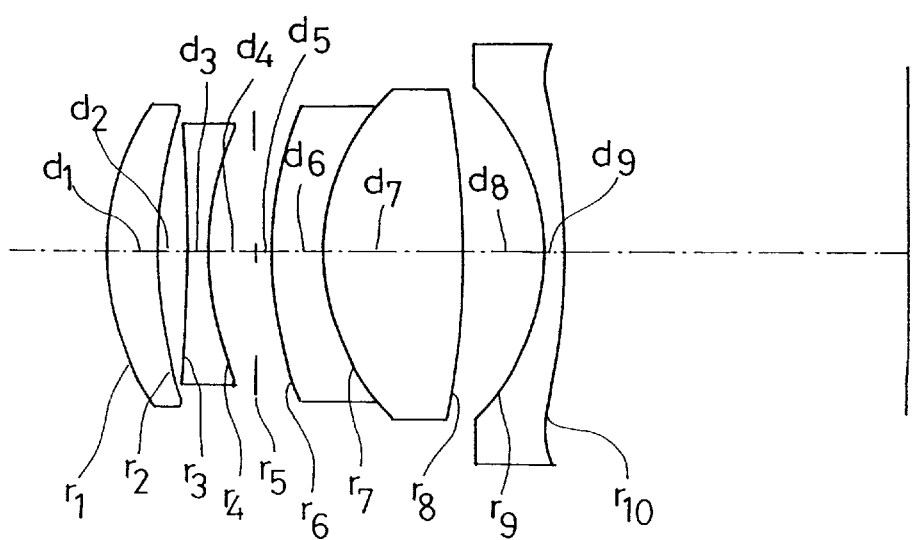
Figure 3:
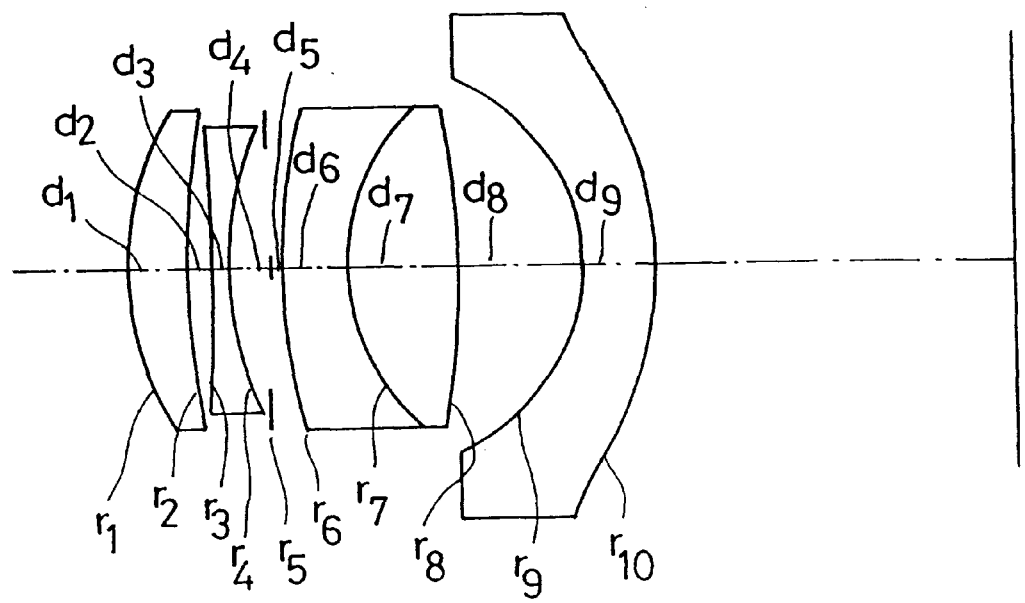

The first embodiment, the second embodiment and the third embodiment are lens systems which have the compositions illustrated in FIGS. 1, 2 and 3 respectively. In each of the lens systems, an aspherical surface is adopted as an image side surface of the fourth lens component in combination with other spherical surfaces and the fourth lens component is made of a resin material.

Figure 4:
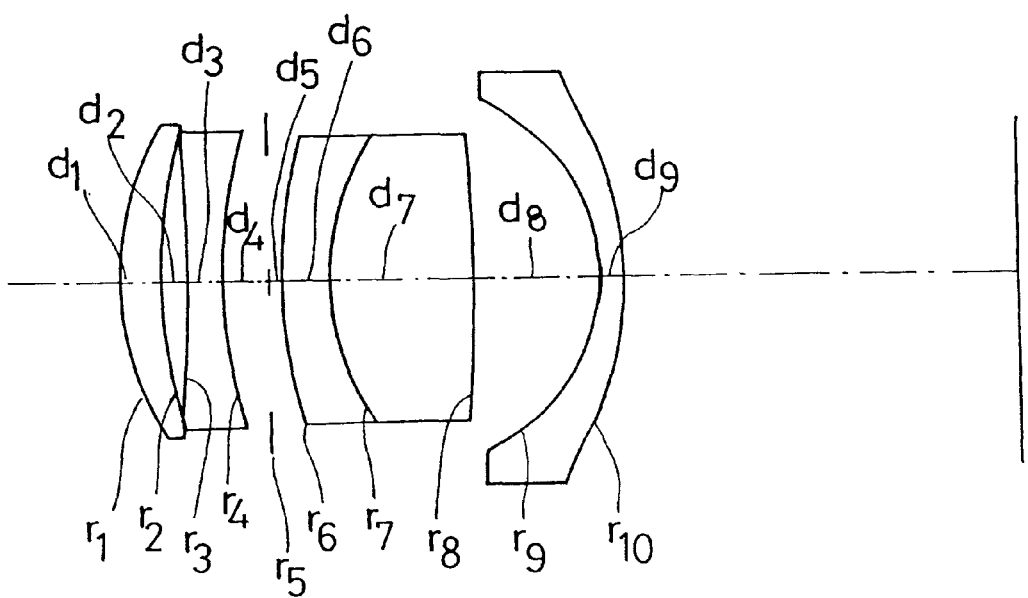

The fourth embodiment has a composition illustrated in FIG. 4, wherein aspherical surfaces are adopted not only as an image side surface of the fourth lens component but also as an image side surface of the third lens component. In the fourth embodiment, the fourth lens component is made of a glass material.

Figure 5:
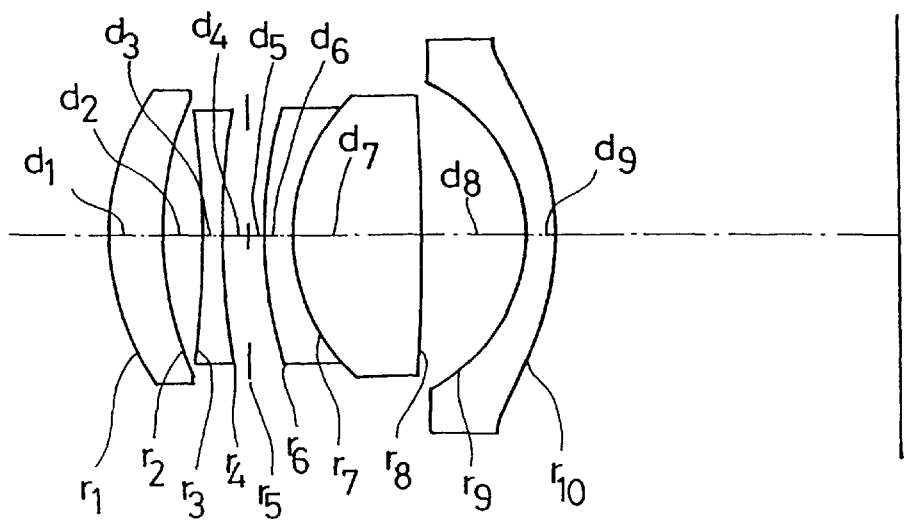
Figure 6:
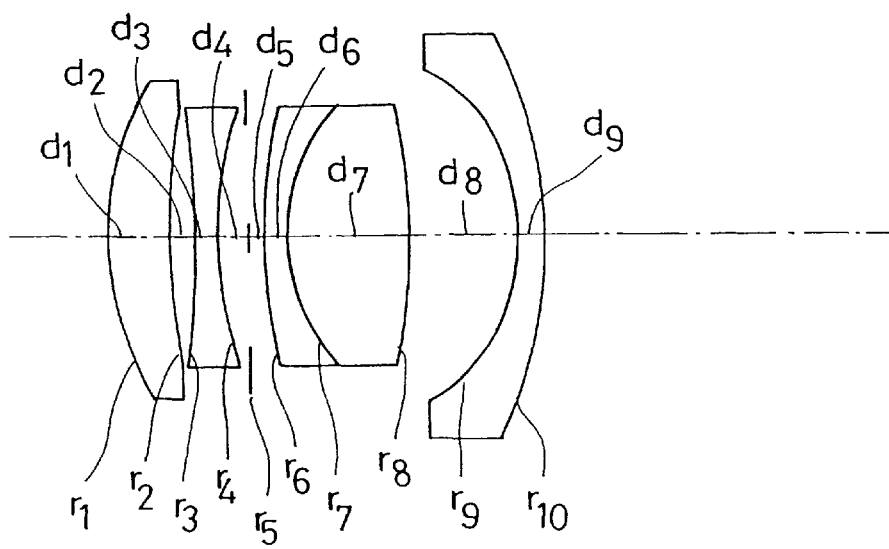
Figure 7:
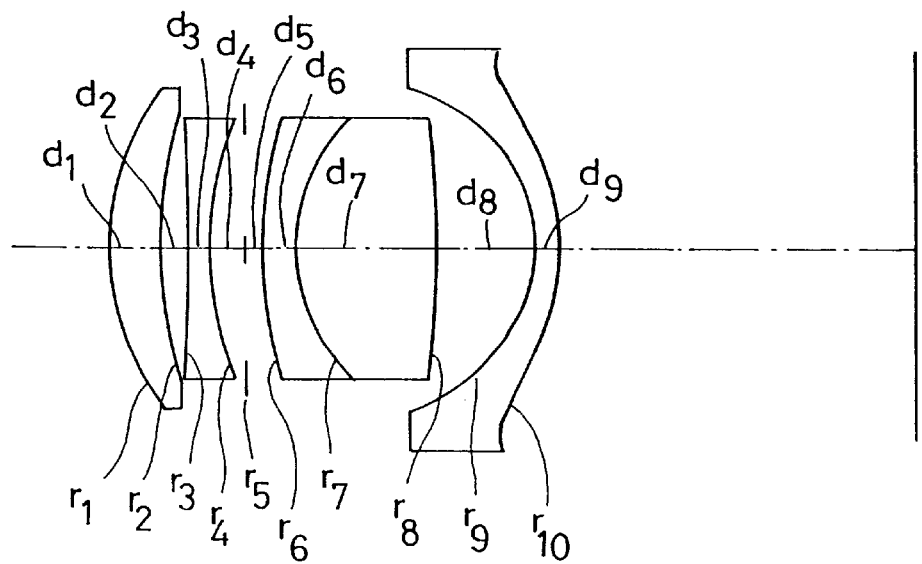
Figure 8:
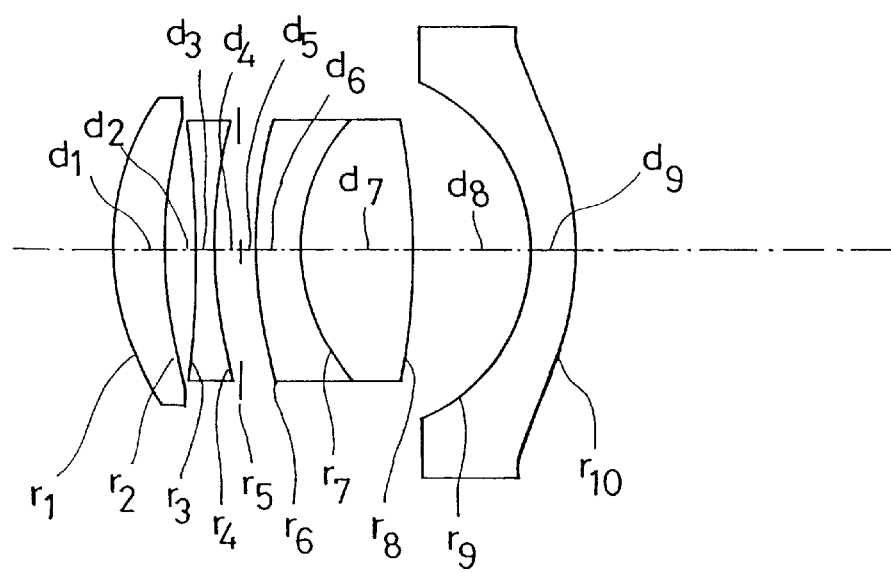
Figure 9:
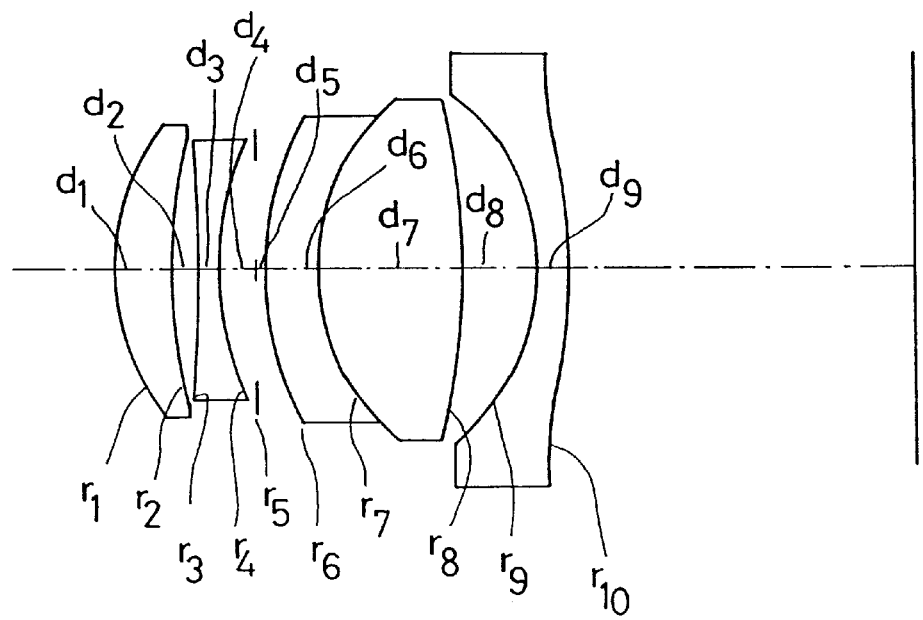
Figure 10:
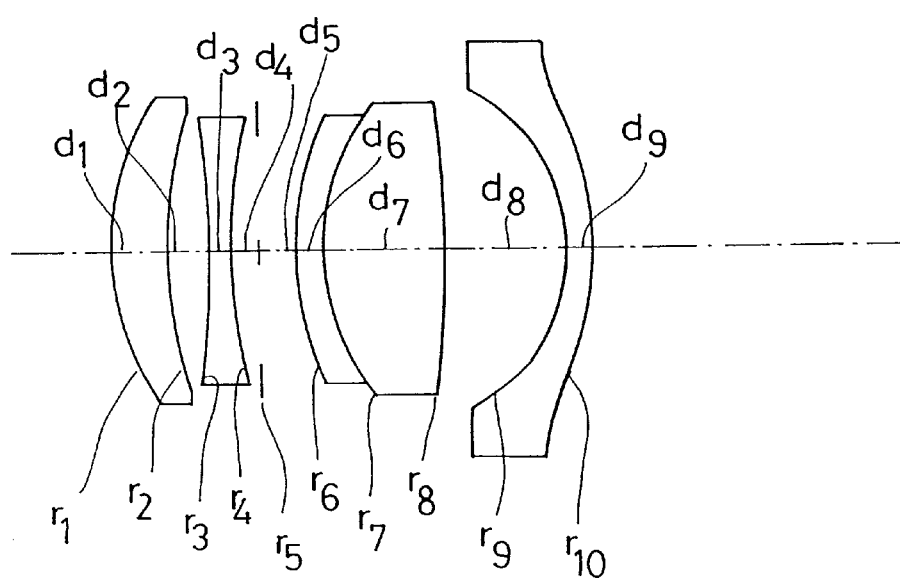
Figure 11:
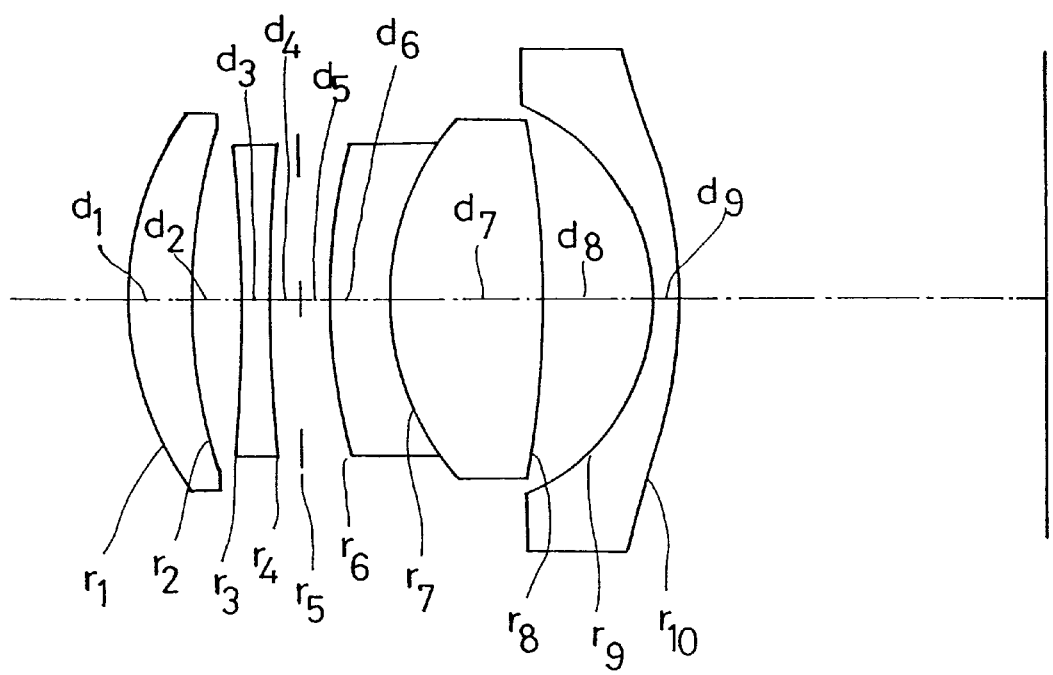

The fifth embodiment has a composition illustrated in FIG. 5, wherein aspherical surfaces are adopted not only for the fourth lens component but also as an image side surface of the third lens component.

In the sixth embodiment, an aspherical surface is used as an object side surface of the fourth lens component and all other surfaces are spherical.

In the seventh embodiment, aspherical surfaces are used as both surfaces of the fourth lens component and all other surfaces are spherical. The fourth lens component is made of a resin material.

In the eighth embodiment, aspherical surfaces are used as an object side surface of the second lens component and an image side surface of the fourth lens component, and all other surfaces are spherical.

In each of the ninth, tenth and eleventh embodiments, aspherical surfaces are used as an image side surface of the third lens component (an image side surface of the biconvex lens element of the cemented lens component) and an image side surface of the fourth lens component, and all other surfaces are spherical.

Figure 12:
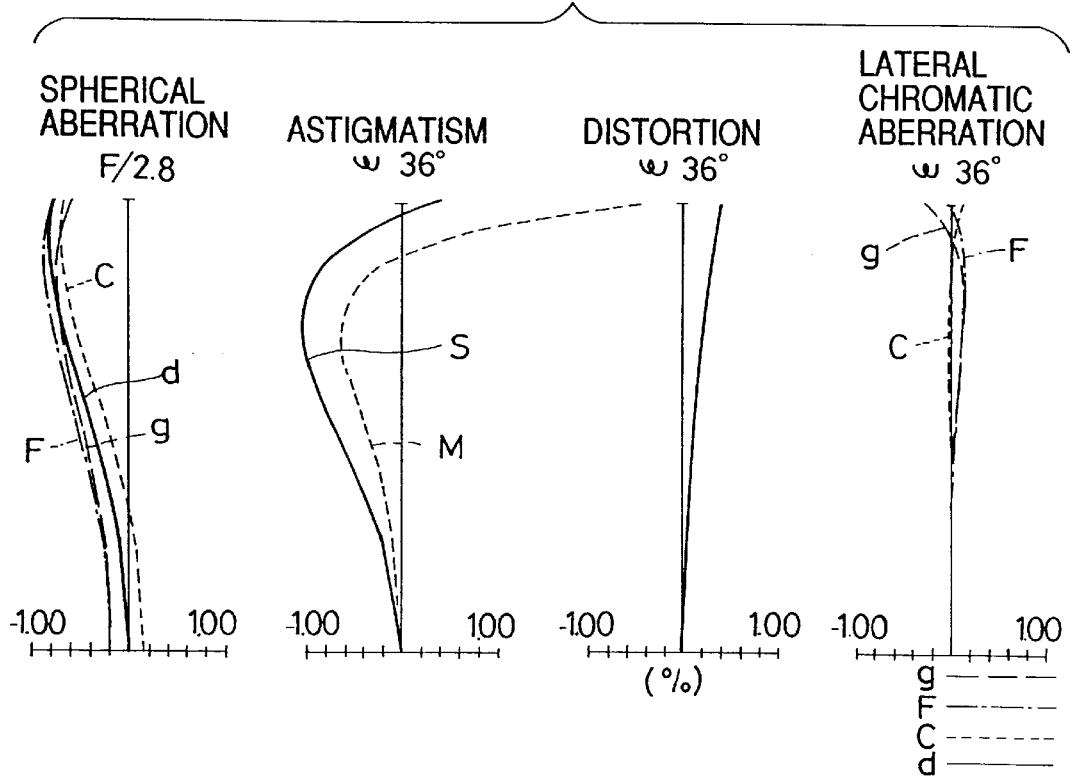
FIGS. 12 and 13 show curves illustrating aberration characteristics of the first embodiment of the present invention.
Figure 13:
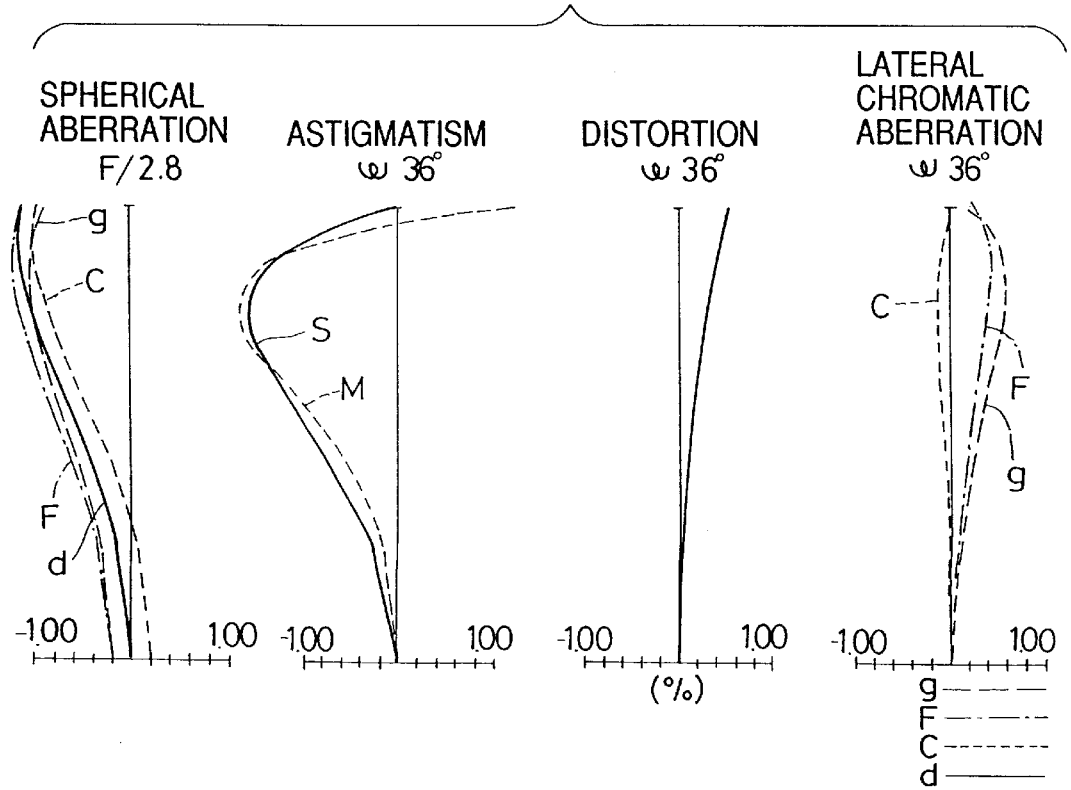

Aberration characteristics of the first embodiment, for example, out of the embodiments described above are illustrated in FIGS. 12 and 13: FIG. 12 showing aberration characteristics of the first embodiment for infinite object distance and FIG. 13 showing aberration characteristics of the first embodiment at a photographic magnification of $-0.1\times$.

The aspherical surfaces used in the embodiments of the present invention are expressed by the following formula:

$$x=(y^2/r)/[1+\{1-(K+1)(y/r)^2\}^{1/2}]+A_4y^4+A_6y^6+A_8y^8+\ldots$$

wherein a direction along an optical axis is taken as the x axis, a direction perpendicular to the optical axis is taken as the y axis, the reference symbol r represents a radius of curvature of a reference sphere, and the reference symbols $K, A_4, A_6, A_8 \ldots$ designate coefficients which express an aspherical surface.

The image pickup optical system according to the present invention has a large aperture and a wide field angle, and corrects aberrations favorably though the optical system uses a small number of aspherical surfaces and is composed of a small number of lens elements. Furthermore, the image pickup optical system allows extremely small variations to be caused by focusing.

What is claimed is:

1. An image pickup optical system comprising, in order from an object side:

a first lens component which comprises a meniscus lens element having a convex surface on an object side thereof and a positive refractive power;

a second lens component which comprises a negative lens element;

a third lens component which comprises a cemented lens component consisting of a negative meniscus lens element having a convex surface on an object side thereof and a biconvex lens element; and a fourth lens component which comprises a negative meniscus lens element having a convex surface on an image side, wherein said optical system comprises a stop which is disposed on the object side of said third lens component, and wherein said optical system satisfies the following conditions (1) and (2):

$$1.2 < R_3/\Delta N_3 \cdot f < 3.0 \quad (1)$$

$$0.1 < \Delta N_3 < 0.25 \quad (2)$$

wherein the reference symbol $R_3$ represents a radius of curvature on a cemented surface of the third lens component, the reference symbol $\Delta N_3$ designates a difference between a refractive index of the biconvex lens element of the third lens component for the d-line and a refractive index of the negative meniscus lens element for the d-line, and the reference symbol f denotes a focal length of the optical system as a whole.

2. An image pickup optical system comprising, in order from an object side:
 a first lens component which comprises a meniscus lens element having a convex surface on an object side thereof and a positive refractive power;
 a second lens component which comprises a negative lens element;
 a third lens component which comprises a cemented lens component consisting of a negative lens element and a positive lens element; and
 a fourth lens component which comprises a negative meniscus lens element having a convex surface on an image side thereof, wherein said optical system satisfies the following condition (3):

$$-2.0 < f/f_4 < -1.2 \quad (3)$$

wherein the reference symbol $f_4$ represents a focal length of the fourth lens component and the reference symbol f designates a focal length of the optical system as a whole.

3. An image pickup optical system comprising, in order from an object side:
 a first lens component which comprises a positive meniscus lens element having a convex surface on an object side thereof and a positive refractive power;
 a second lens component which comprises a negative lens element;
 a third lens component which comprises a cemented lens component consisting of a negative lens element and a positive lens element; and
 a fourth lens component which comprises a negative meniscus lens element having a convex surface on an image side thereof,
 wherein said optical system comprises a stop which is disposed on an object side of the third lens component, and
 wherein said optical system satisfies the following condition (4):

$$-0.5 < f/f_{12} < 0.1 \quad (4)$$

wherein the reference symbol $f_{12}$ represents a total focal length of the first lens component and the second lens component, and the reference symbol f designates a focal length of the optical system as a whole.

4. An image pickup optical system comprising, in order from an object side:
 a first lens component which comprises a positive meniscus lens element having a convex surface on an object side thereof;
 a second lens component which comprises a negative lens element;
 a third lens component which comprises a cemented lens component consisting of a negative lens element and a positive lens element; and
 a fourth lens component which comprises a negative lens element,
 wherein said optical system satisfies the following condition (7):

$$0.2 < D_3/f < 0.3 \quad (7)$$

wherein the reference symbol $D_3$ represents a spacing from an object side surface to an image side surface of the third lens component and the reference symbol f designates a focal length of the optical system as a whole.

5. An image pickup optical system comprising, in order from on an object side:
 a first lens component which comprises a positive meniscus lens element having a convex surface on an object side thereof;
 a second lens component which comprises a negative meniscus lens element;
 a third lens component which comprises a cemented lens component consisting of a negative lens element and a positive lens element; and
 a fourth lens component which comprises a negative lens element having a convex surface on an object side thereof,
 wherein said optical system comprises a stop which is disposed on an object side of the third lens component, and
 wherein said optical system satisfies the following condition (8):

$$0.4 < \Sigma D_{s-4}/f < 0.5 \quad (8)$$

wherein the reference symbol $\Sigma D_{s-4}$ represents a distance measured from the stop to the fourth lens component and the reference symbol f designates a focal length of the optical system as a whole.

6. An image pickup optical system comprising in order from an object side:
 a first lens component which comprises a positive meniscus lens element having a convex surface on an object side thereof;
 a second lens component which comprises a negative lens element;
 a third lens component which comprises a cemented lens component consisting of a negative meniscus lens element and a positive lens element; and
 a fourth lens component which comprises a negative meniscus lens element having a convex surface on an image side thereof, wherein said third lens component comprises, in order from an object side thereof, a negative meniscus lens element and a positive lens element, and has a biconvex shape as a whole, and wherein said optical system satisfies the following conditions (1) and (2):

$$1.2 < R_3/\Delta N_3 \cdot f < 3.0 \quad (1)$$

$$0.1 < \Delta N_3 < 0.25 \quad (2)$$

wherein the reference symbol $R_3$ represents a radius of curvature on a cemented surface of the third lens component, the reference symbol $\Delta N_3$ designates a difference between a refractive index of the biconvex lens element of the third lens component for the d-line and a refractive index of the negative meniscus lens element for the d-line, and the reference symbol f denotes a focal length of the optical system as a whole.

7. An image pickup optical system according to claim 1, 2, 4, 5 or 6 satisfying the following condition (3):

$$-2.0 < f_4/f < -1.2 \tag{3}$$

wherein the reference symbol $f_4$ represents a focal length of the fourth lens component and the reference symbol f designates a focal length of the optical system as a whole.

8. An image pickup optical system comprising, in order from an object side:

- a first lens component which comprises a positive meniscus lens element having a convex surface on an object side thereof;
- a second lens component which comprises a negative lens element;
- a third lens component which comprises a cemented lens component consisting of a negative lens element and a positive lens element; and
- a fourth lens component which comprises a negative meniscus lens element having a convex surface on an image side thereof,
- wherein said optical system comprises a stop which is disposed on an object side of the third lens component, and
- wherein said optical system satisfies the following conditions (4) and (5):

$$-0.5 < f/f_{12} < 0.1 \tag{4}$$

$$n_1 > n_2 \tag{5}$$

wherein the reference symbol $f_{12}$ represents a total focal length of the first lens component and the second lens component, the reference symbol f designates a focal length of the optical system as a whole, and the reference symbols $n_1$ and $n_2$ represent refractive indices of the first lens component and the second lens component respectively.

9. An image pickup optical system according to claim 3 or 8 satisfying the following condition (6):

$$1.3 < f/r_2 - f/r_3 < 3.0 \tag{6}$$

wherein the reference symbols $r_2$ and $r_3$ represent radii of curvature on an image side surface of the first lens component and on an object side surface of the second lens component respectively.

10. An image pickup optical system comprising, in order from an object side:

- a first lens component which comprises a meniscus lens element having a convex surface on an object side thereof and a positive refractive power;
- a second lens component which comprises a negative lens element;
- a third lens component which comprises a cemented lens component consisting of a negative meniscus lens element having a convex surface on an object side thereof and a biconvex lens element; and
- a fourth lens component which comprises a negative meniscus lens element having a convex surface on an image side thereof, wherein said optical system comprises a stop which is disposed on the object side of said third lens component, and wherein said optical system satisfies the following conditions (1) and (3):

$$1.2 < R_3/\Delta N_3 \cdot f < 3.0 \tag{1}$$

$$-2.0 < f/f_4 < -1.2 \tag{2}$$

wherein the reference symbol $R_3$ represents a radius of curvature on a cemented surface of the third lens component, the reference symbol $\Delta N_3$ designates a difference between a refractive index of the biconvex lens element of the third lens component for the d-line and a refractive index of the negative meniscus lens element for the d-line, the reference symbol f denotes a focal length of the optical system as a whole, and the reference symbol $f_4$ represents a focal length of the fourth lens component.

11. An image pickup optical system according to claim 1 or 10 satisfying the following condition (7):

$$0.2 < D_3/f < 0.3 \tag{7}$$

wherein the reference symbol $D_3$ represents a distance as measured from an object side surface to an image side surface of the third lens component.

12. An image pickup optical system according to claim 1, 3 or 10 satisfying the following condition (8):

$$0.4 < \Sigma D_{s-4}/f < 0.5 \tag{8}$$

wherein the reference symbol $\Sigma D_{s-4}$ represents a distance as measured from the stop to an object side surface of the fourth lens component.

13. An image pickup optical system comprising in order from an object side:

- a first lens component which comprises a positive meniscus lens element having a convex surface on an object side thereof;
- a second lens component which comprises a negative lens element;
- a third lens component which comprises a cemented lens component consisting, in order from an object side thereof, a negative lens element and a positive lens element, wherein said third lens component has a biconvex shape as a whole; and
- a fourth lens component which comprises a negative meniscus lens element having a convex surface on an image side thereof; and
- wherein said optical system satisfies the following condition (3):

$$-2.0 < f/f_4 < -1.2 \tag{3}$$

wherein the reference symbol $R_3$ represents a radius of curvature on a cemented surface of the third lens component, the reference symbol f denotes a focal length of the optical system as a whole, and the reference symbol $f_4$ represents a focal length of the fourth lens component.

14. An image pickup optical system according to claim 1, 2, 4, 6, 10 or 13 satisfying the following condition (9)

$$-0.5 < \phi_{3n}/\phi_{3p} < -0.25 \tag{9}$$

wherein the reference symbols $\phi_{3p}$ and $\phi_{3n}$ powers of the positive lens element and the negative lens element respectively of the third lens component.

15. An image pickup optical system comprising, in order from an object side:

- a first lens component which comprises a meniscus lens element having a convex surface on an object side thereof and a positive refractive power;
- a second lens component which comprises a negative lens element;
- a third lens component which comprises a cemented lens component consisting of a negative meniscus lens element having a convex surface on an object side thereof and a biconvex lens element; and a fourth lens component which comprises a negative meniscus lens element having a convex surface on an image side thereof, wherein said optical system comprises a stop which is disposed on the object side of said third lens component, and wherein said optical system satisfies the following conditions (1) and (7):

$$1.2 < R_3/\Delta N_3 \cdot f < 3.0 \quad (1)$$

$$0.2 < D_3/f < 0.3 \quad (7)$$

wherein the reference symbol $R_3$ represents a radius of curvature on a cemented surface of the third lens component, the reference symbol $\Delta N_3$ designates a difference between a refractive index of the biconvex lens element of the third lens component for the d-line and a refractive index of the negative meniscus lens element for the d-line, the reference symbol f denotes a focal length of the optical system as a whole, and the reference symbol $D_3$ represents a spacing from an object side surface to an image side surface of the third lens component.

16. An image pickup optical system according to claim 1, 2, 3, 4, 5, 6, 10, 13 or 15 wherein the first lens component, the second lens component and the third lens component have spherical surfaces only.

17. An image pickup optical system comprising, in order from an object side:

a first lens component which comprises a meniscus lens element having a convex surface on an object side thereof and a positive refractive power;

a second lens component which comprises a negative lens element;

a third lens component which comprises a cemented lens component consisting of a negative meniscus lens element having a convex surface on an object side thereof and a biconvex lens element; and a fourth lens component which comprises a negative meniscus lens element having a convex surface on an image side thereof, wherein said optical system comprises a stop which is disposed on the object side of said third lens component, and wherein said optical system satisfies the following conditions (1) and (8):

$$1.2 < R_3/\Delta N_3 \cdot f < 3.0 \quad (1)$$

$$0.4 < \Sigma D_{s-4}/f < 0.5 \quad (8)$$

wherein the reference symbol $R_3$ represents a radius of curvature on a cemented surface of the third lens component, the reference symbol $\Delta N_3$ designates a difference between a refractive index of the biconvex lens element of the third lens component for the d-line and a refractive index of the negative meniscus lens element for the d-line, the reference symbol f denotes a focal length of the optical system as a whole, and the reference symbol $\Sigma D_{s-4}$ represents distance measured from the stop to the fourth lens component.

18. An image pickup optical system comprising in order from an object side:

a first lens component which comprises a positive meniscus lens element having a convex surface on an object side thereof;

a second lens component which comprises a negative lens element;

a third lens component which comprises a cemented lens component consisting of a negative meniscus lens element and a positive lens element; and a fourth lens component which comprises a negative meniscus lens element having a convex surface on an image side thereof, wherein said third lens component comprises, in order from an object side thereof, a negative meniscus lens element and a positive lens element, and has a biconvex shape as a whole, and wherein said optical system satisfies the following condition (8):

$$0.4 < \Sigma D_{s-4}/f < 0.5 \quad (8)$$

wherein the reference symbol $\Sigma D_{s-4}$ represents distance measured from the stop to the fourth lens component and the reference symbol f designates a focal length of the optical system as a whole.

19. An image pickup optical system comprising, in order from an object side:

a first lens component which comprises a positive meniscus lens element having a convex surface on an object side thereof and a positive refractive power;

a second lens component which comprises a negative lens element;

a third lens component which comprises a cemented lens component consisting of a negative lens element and a positive lens element; and a fourth lens component which comprises a negative meniscus lens element having a convex surface on an image side thereof, wherein said optical system comprises a stop which is disposed on an object side of the third lens component, and wherein said optical system satisfies the following conditions (4), (5) and (6):

$$-0.5 < f/f_{12} < 0.1 \quad (4)$$

$$n_1 > n_2 \quad (5)$$

$$1.3 < f/r_2 - f/r_3 < 3.0 \quad (6)$$

wherein the reference symbol $f_{12}$ represents a total focal length of the first lens component and the second lens component, and the reference symbol f designates a focal length of the optical system as a whole, the reference symbols $n_1$ and $n_2$ represent refractive indices of the first lens component and the second lens component respectively, the reference symbol $r_2$ designates a radius of curvature on the image side surface of the first lens component and the reference symbol $r_3$ denotes a radius of curvature on an object side surface of the second lens component.

* * * * *